Sept. 18, 1934.   J. CATRON, JR   1,974,100
INTERNAL COMBUSTION ENGINE
Filed Aug. 31, 1933   3 Sheets-Sheet 1

Inventor
Joseph Catron Jr.
By Clarence A. O'Brien
Attorney

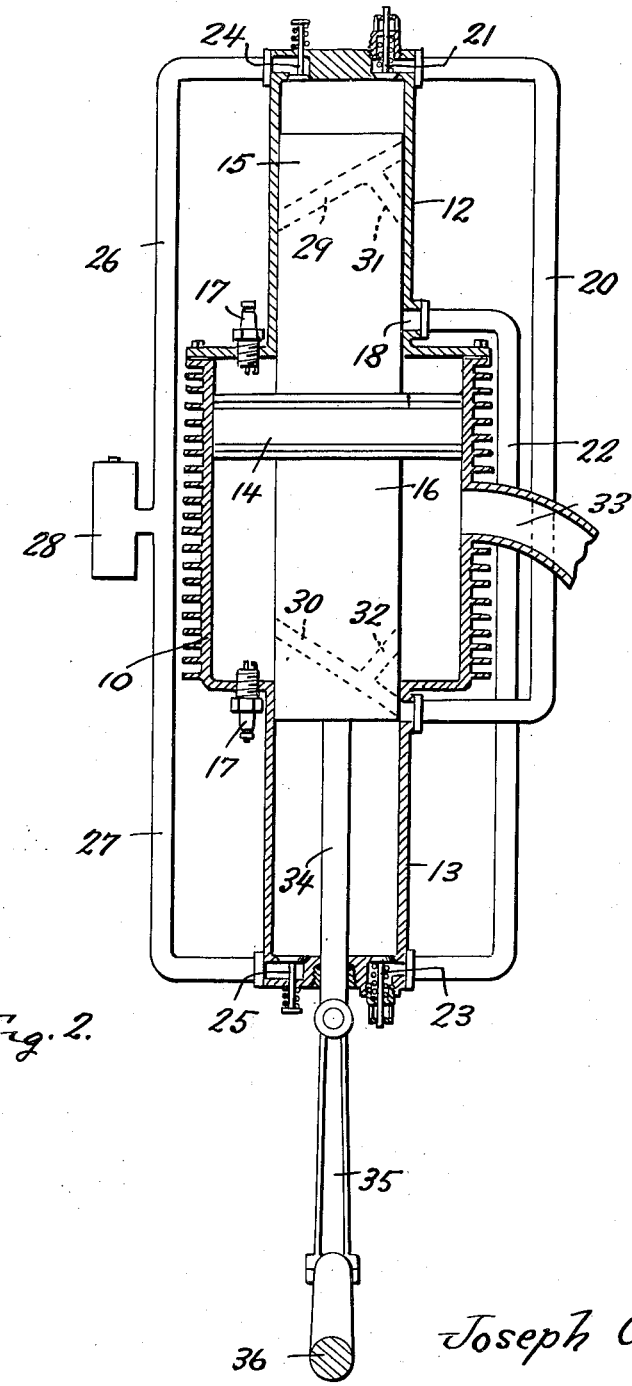

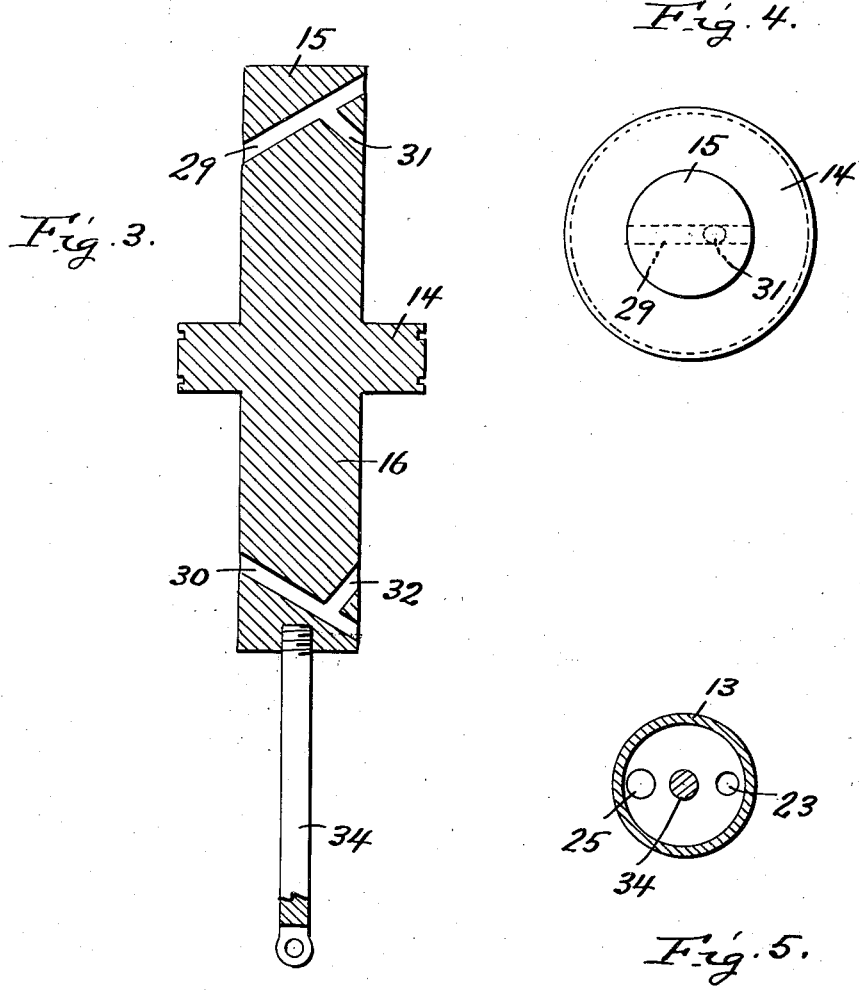

Patented Sept. 18, 1934

1,974,100

UNITED STATES PATENT OFFICE 1,974,100

INTERNAL COMBUSTION ENGINE

Joseph Catron, Jr., Bigelow, Mo.

Application August 31, 1933, Serial No. 687,713

1 Claim. (Cl. 123—62)

This invention relates to internal combustion engines and has as its object to improve upon a single cylinder or one-cycle gas engine.

The invention together with its objects and advantages will be best understood from a study of the following description taken in connection with the accompanying drawings wherein is illustrated a preferred embodiment of the invention.

In the drawings:

Figure 2 is a view similar to Figure 1 showing a second position of the piston.

Figure 3 is a longitudinal sectional view through the piston and pump or piston extensions associated therewith.

Figure 4 is a top plan view of the piston, and

Figure 5 is a sectional view taken substantially on the line 5—5 of Figure 1.

Figure 1:
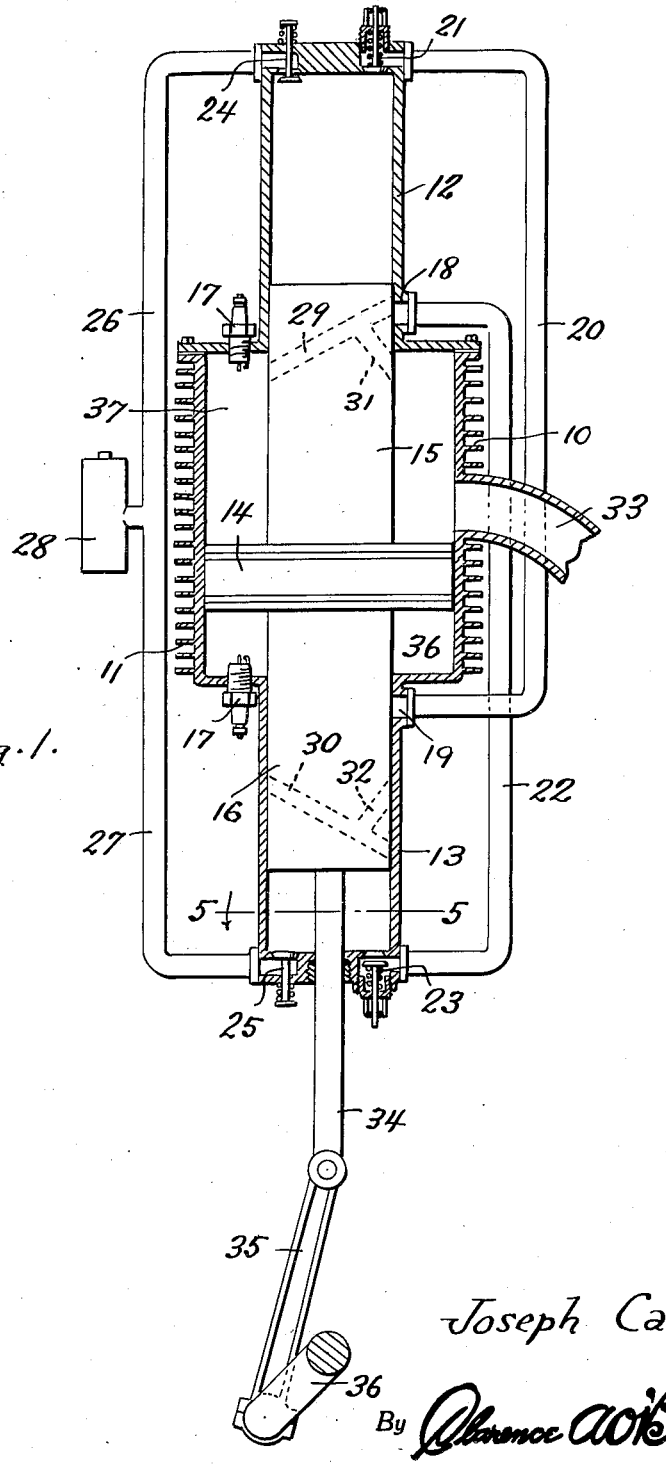
Figure 1 is a view with parts in section, and other parts in elevation showing one position of the piston.

Referring to the drawings by reference numerals it will be seen that the engine comprises the single cylinder 10, the same being shown, in the present instance as equipped with cooling fins 11. At the top thereof the cylinder 10 is provided with a pump or cylinder extension 12, and at the bottom thereof with a pump or cylinder extension 13.

Mounted for reciprocation within the cylinder 11 is a power piston 14 that is provided at the top thereof with a pump-piston extension 15 arranged to operate within the cylinder 12, and at the bottom thereof the piston 14 is provided with a pump-piston extension 16 arranged to reciprocate within the cylinder 13. At its top and bottom the piston 10 is provided with spark plug holes in which are suitably arranged spark plugs 17. Intake ports for the pistons are provided as at 18 and 19 and the port 19 of the cylinder 13 is connected by a piping or fuel conduit 20 with a fuel outlet port provided in the top of cylinder 12 and controlled by an outwardly opening valve 21. Port 18 of cylinder 12 is connected by a pipe or fuel conduit 22 with a fuel outlet port controlled by an outwardly opening spring pressed valve 23. The cylinders 12 and 13 at the ends thereof equipped with the valves 21, 23 are also provided with fuel ports controlled by inwardly opening valves 24, 25 and the ports controlled by these last named valves are connected by piping or conduit means 26, 27 with a suitable mixing valve 28 which is connected with any suitable device for supplying a fuel mixture of air and gasoline thereto.

The pistons 15, 16 adjacent their free ends are provided with diagonal ports 29, 30 that extend therethrough and are provided with oppositely inclined branches 31, 32 to distribute the fuel supplied through the ports to the cylinder 10.

Intermediate its ends the cylinder 10 is provided with exhaust means 33.

The pump-piston extension 16 is provided with a connecting rod 34 that is rigid and is pivotally connected to one end of a connecting rod 35 suitably engaged with the drive shaft and in the usual manner.

In actual practice the piston 14 divides the cylinder 10 into two combustion chambers. With the parts shown in Figure 1 fuel in the combustion chamber 37 is being compressed while the port 29 in the pump-piston extension 15 is moving into alinement with the port 18 so that fuel in the cylinder 13 is forced therefrom by the downward movement of the pump-piston extension 16 and forced from the cylinder 13 through the conduit 22 and port 18 and passed through the conduit 29, 31 into the combustion chamber 37. At the same time on the downward movement of the pump-piston extension 15 fuel is being drawn into the cylinder 12 from the valve 28 through the pipe 26 and port controlled by the valve 24.

After the explosion takes place in the chamber 36 piston 14 will move upwardly so that fuel in the cylinder 12 will be forced therefrom through the valve 21 and conduit 20 to pass into the cylinder 13 when the fuel passage or port 30, pipe 32 in the piston 16 is in registry with the port 19. Obviously as the piston moves upwardly to compress the fuel in the combustion chamber 37 the exhaust 33 will be opened permitting the burnt gases to discharge therethrough from the chamber 36. Also at the same time piston 16 moving upwardly with piston 14 will cause fuel to be drawn from the valve 28 through the line 27 and valve 25 to replenish the fuel in the cylinder 13. Manifestly after the explosion of the fuel in the chamber 37 the above detailed cycle of operation is repeated and is continuously repeated during the operation of the engine.

Having thus described my invention, what I claim as new is:

In an internal combustion engine, a cylinder, a piston mounted for reciprocation in said cylinder and dividing the same into two combustion chambers, fuel ignition means for each of the combustion chambers, said cylinder being also provided with a single exhaust means common to said combustion chambers, a pump cylinder extending from each end of the first named cylinder and in communication with said combustion chambers, pump-piston extensions connected with the first named piston and operating in said cylinders, each of said pump cylinders at the end thereof adjacent the first named cylinder being provided with a fuel port, and at the end thereof remote from the first named cylinder provided with a pair of valve controlled ports, a fuel conduit line connecting the fuel port of each cylinder with one of the valve control ports of the other of the pump cylinders, each of said pump cylinders having the other of its valve controlled ports connected with a fuel feed line, a mixing valve connected with the fuel feed line, each of said pump pistons being also provided with a diagonal fuel passage therethrough adapted to register at one end with the first named port of a pump cylinder, and also having a branch passage opening at the side of the pump piston opposite to the side of said piston into which the diagonal fuel passage opens; a drive shaft, and an operating connection between said drive shaft and one of the pump pistons.

JOSEPH CATRON, Jr.